US006123796A

United States Patent [19]

Kathmann et al.

[11] Patent Number: 6,123,796

[45] Date of Patent: Sep. 26, 2000

[54] METHOD OF MAKING AND APPLYING COMBINATION ARTICLE SECURITY TARGET AND PRINTED LABEL

[75] Inventors: John A. Kathmann, Cleves, Ohio; Albert Randall Barlow, Union, Ky.

[73] Assignee: Superior Label Systems, Inc., Mason, Ohio

[21] Appl. No.: 09/118,528

[22] Filed: Jul. 17, 1998

Related U.S. Application Data

[60] Continuation of application No. 08/761,214, Dec. 6, 1996, abandoned, which is a division of application No. 08/542,880, Oct. 13, 1995, abandoned.

[51] Int. Cl.[7] .......................... B32B 31/10; B32B 31/24; B65C 1/00

[52] U.S. Cl. .......................... 156/249; 156/152; 156/300; 156/301; 156/302; 156/DIG. 1; 340/551; 340/572

[58] Field of Search .......................... 156/247, 249, 156/300, 301, 302, 303, 324, 152, DIG. 1, DIG. 2, DIG. 20; 340/551, 572

[56] References Cited

U.S. PATENT DOCUMENTS

| | | | |
|---|---|---|---|
| 3,636,408 | 1/1972 | Shuman . | |
| 4,475,969 | 10/1984 | Reed . | |
| 4,717,438 | 1/1988 | Benge et al. . | |
| 4,900,386 | 2/1990 | Richter-Jorgensen | 340/572 X |
| 4,932,684 | 6/1990 | Vermeulen . | |
| 4,967,185 | 10/1990 | Montean | 340/572 |
| 5,081,445 | 1/1992 | Gill et al. . | |
| 5,146,204 | 9/1992 | Zhou et al. . | |
| 5,167,752 | 12/1992 | Dowling . | |
| 5,184,111 | 2/1993 | Pichl . | |
| 5,200,243 | 4/1993 | Van Neen . | |
| 5,284,689 | 2/1994 | Laurash et al. . | |
| 5,394,293 | 2/1995 | Grarovsky . | |
| 5,432,499 | 7/1995 | Montean | 340/572 |
| 5,477,219 | 12/1995 | Zarembo et al. | 340/572 |
| 5,512,125 | 4/1996 | Momot et al. . | |
| 5,560,970 | 10/1996 | Ludebuhl . | |
| 5,614,278 | 3/1997 | Chamberlain et al. . | |
| 5,660,663 | 8/1997 | Chamberlain et al. . | |
| 5,867,102 | 2/1999 | Souder et al. | 340/572 |

FOREIGN PATENT DOCUMENTS

| | | |
|---|---|---|
| 2164915 | 4/1986 | United Kingdom . |
| 8502285 | 5/1985 | WIPO . |
| 9504853 | 2/1995 | WIPO . |

*Primary Examiner*—Curtis Mayes
*Attorney, Agent, or Firm*—Wood, Herron & Evans, L.L.P.

[57] ABSTRACT

A combination of a preprinted pressure sensitive label and an electronic article security system target is provided, preferably as a supply of labels on a backing material web with the target between. The labels preferably extend about at least about ⅛th inch around the edge of the target to directly adhere to the products. Articles may be selectively marked with targets so concealed to deter theft with fewer targets. The combinations may be formed by applying first the target, then the label, to the article. Preferably, label and target combinations are supplied on a web and are then applied to the products. Combination label and target supplies may be formed by separating the preprinted labels from their backing material webs, applying the targets to either the label or the backing material, and then combining the label with either the same backing material web or a different one. With discrete cut labels on a backing web, pressure sensitive adhesive coated targets are applied to the web and pressure sensitive labels are applied over them. For high speed production, targets are applied to the adhesive side of an uncut label web that has been separated from its backing material, then re-laminating the combination onto the same or a different backing material web. Discharges of electrostatic charge that could damage the target circuits are reduced by using rollers and peeling knives made of non-electrically conductive materials to contact the markers or targets and by using ionized gas to neutralize the charge.

16 Claims, 5 Drawing Sheets

FIG. 1
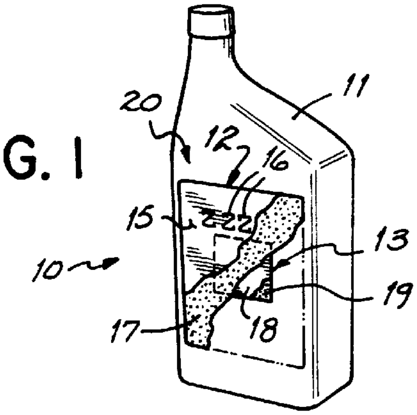
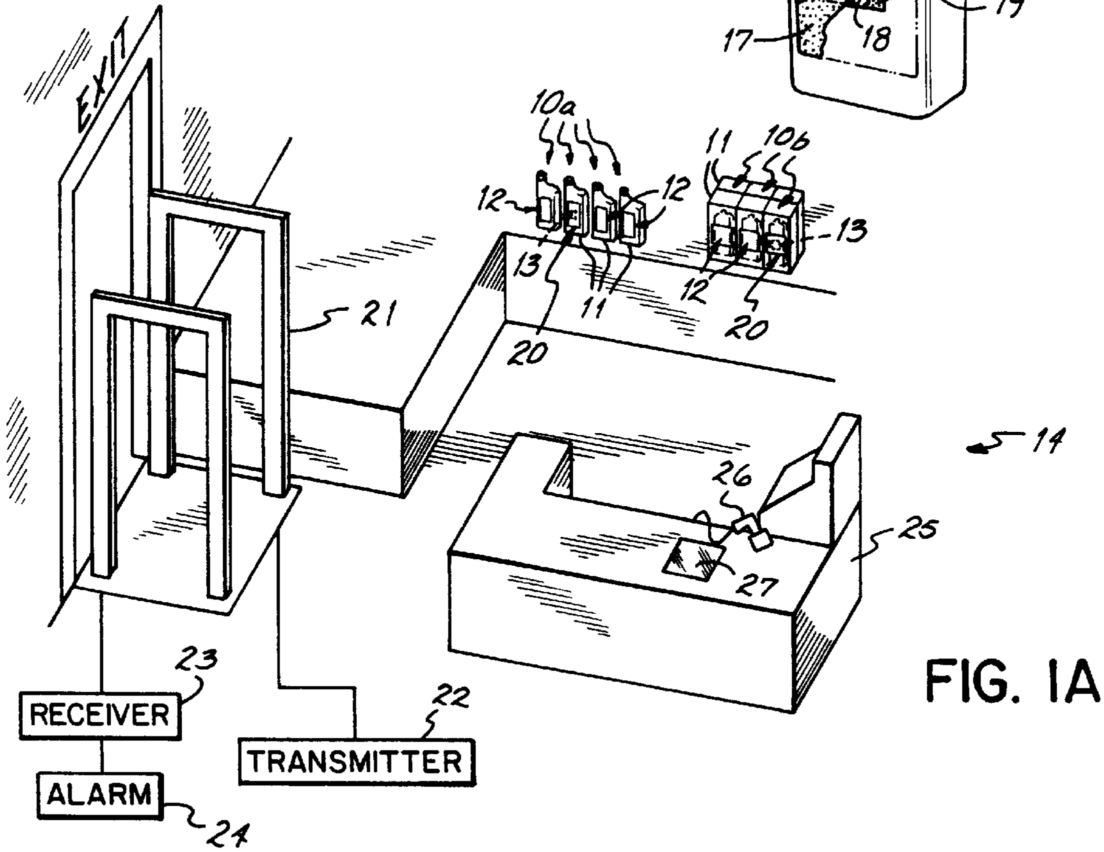
FIG. 1A
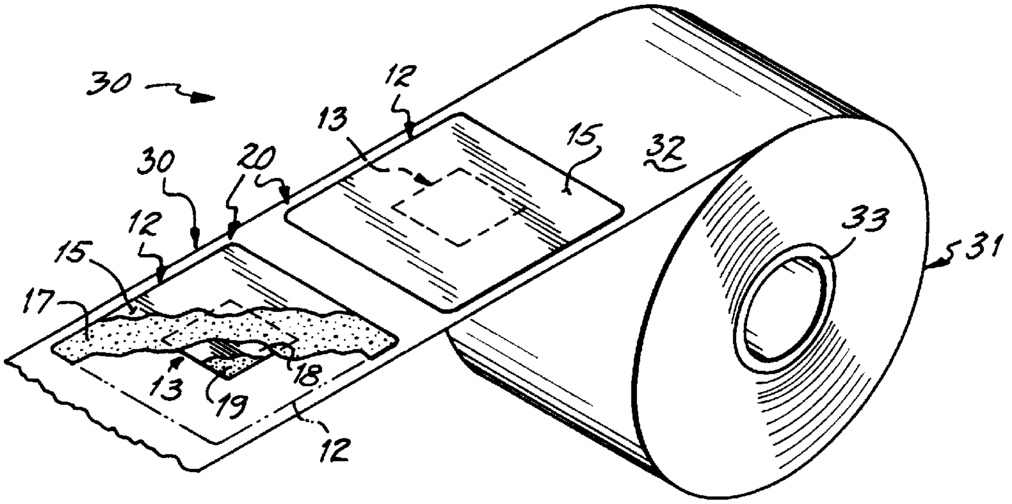
FIG. 2

FIG. 4A
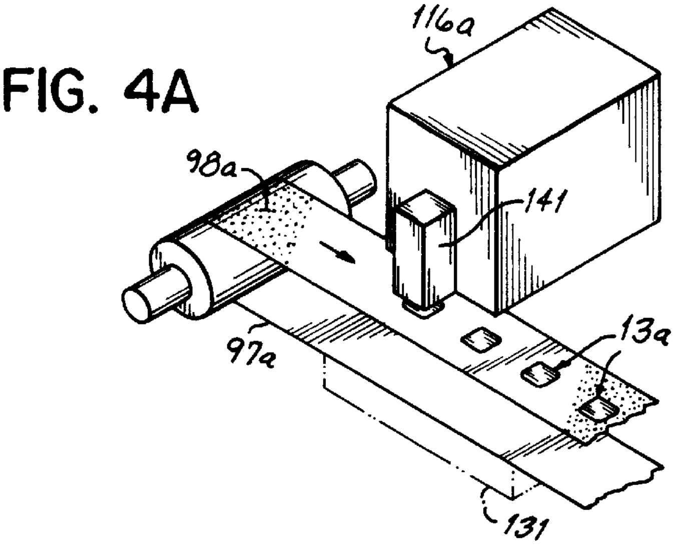
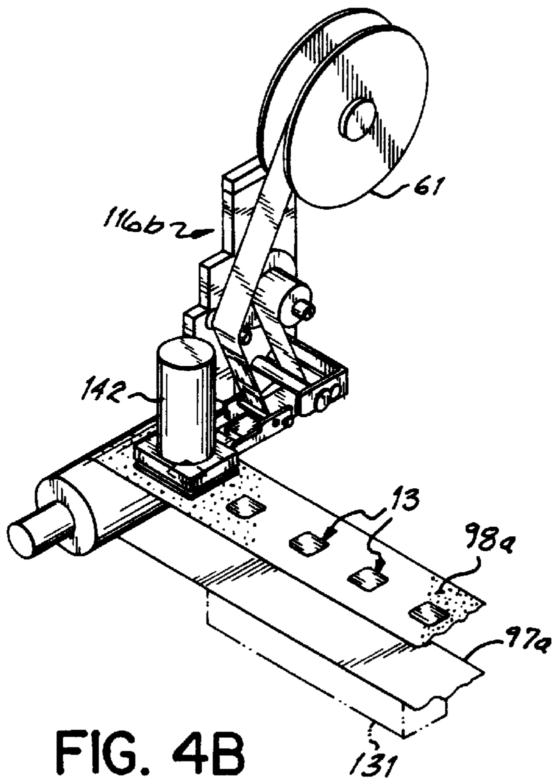
FIG. 4B
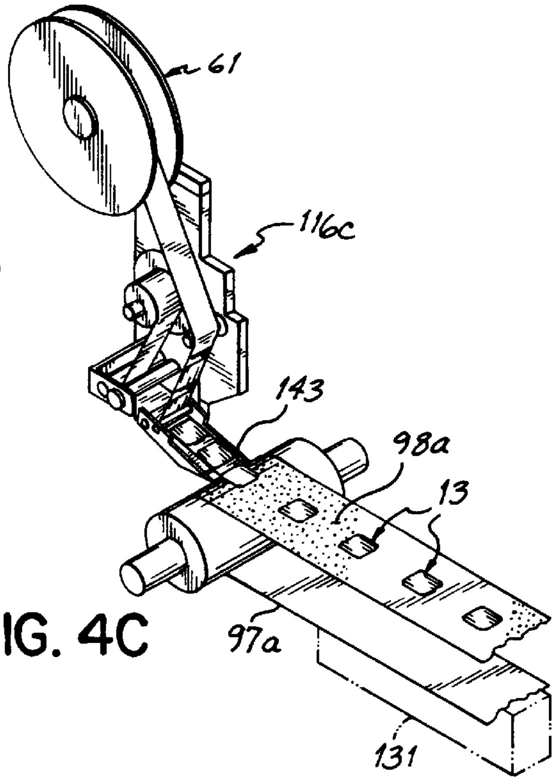
FIG. 4C

METHOD OF MAKING AND APPLYING COMBINATION ARTICLE SECURITY TARGET AND PRINTED LABEL

This is a continuation of application Ser. No. 08/761,214, filed Dec. 6, 1996, now abandoned, which is a division of application Ser. No. 08/542,880 filed Oct. 13, 1995, now abandoned, both expressly incorporated by reference herein.

FIELD OF THE INVENTION

The present invention relates to electronic article surveillance (EAS) targets or markers, and to the adhesive application to and concealment on articles of flat, thin targets or markers. More particularly, the present invention relates to the combination of such targets or markers with printed labels and to the methods and machines for making such combinations, and methods and machines for application onto the articles.

BACKGROUND OF THE INVENTION

Electronic article merchandising (EAM) is the use of electronic systems to deter and control theft from retail stores. It is one of several article security systems used in retail stores, libraries and other establishments where theft of articles is a problem. Such systems are more generally referred to as electronic article surveillance or electronic article security systems (EAS). EAS systems employ passive electronic circuits affixed to articles in such establishments that cause the activation of monitoring devices at the exits from the establishments.

The circuits, referred to as targets or markers, are made in the form of disposable paper targets and reusable flexible or hard plastic targets. The devices at the exits of the establishments each include a transmitter, a receiver and an alarm. The transmitter emits a signal that activates the circuit in the target when unauthorized removal of the article from the establishment occurs.

The activation of the target circuit causes the circuit to modify, retransmit or otherwise communicate a signal back to the device where it is detected by the receiver. When the receiver detects a signal from the target circuit, it activates the alarm. For authorized removal of the article from the establishment, activation of the alarm is prevented by removal of reusable targets from the articles before removal of the article from the establishment, by bypassing the exit device where the removal of the article is properly accounted for, or by deactivation of the target by a deactivation device. Deactivation devices may, for example, be in the form of non-contact plate shaped signal generating devices at a checkout lane or other point-of-sale location. Various EAS systems and the components thereof are described in U.S. Pat. Nos. 4,321,586, 4,384,281, 4,598,276, 4,660,025, 5,081,445, 5,103,234, 5,121,103 and 5,353,001, for example.

Disposable paper targets are usually in the form of flat, thin rectangular laminates, one to three inches on a side, fixed to articles of merchandise by pressure sensitive or other types of adhesive. These paper targets are sometimes imprinted with text, graphics or bar code information. Paper targets are either applied to the product at the vendor level or imbedded in the product or package at the point-of-manufacture. Such targets or markers are described, for example, in U.S. Pat. Nos. 4,835,524, 5,103,210, 5,142,270, 5,182,544 and 5,432,499. These patents, and the other patents referred to above are hereby expressly incorporated herein by reference.

Application of a target to an article can undesirably alter the appearance of the article or obscure text information or graphics on the article. Often the design of an article or its package occupies most of the available surface leaving no area on which a target can be applied without covering important information or interfering with the visual appearance of the article. The preprinting of the target with text or graphics relating to the product can not always be carried out so as to provide a target that, when affixed to the article, is compatible with the article design.

The affixing of a target to an article in a clearly visible location in an establishment in which not all of the articles are provided with targets may aid an experienced thief having the ability to select for theft only those articles that are not marked with such targets. Concealment of the target on an article, at either the vendor's location or at the point-of-manufacture, is considered to increase overall article security, but is often impractical. Proposals have been made to place targets on bottles beneath a non-pressure-sensitive gummed label wrapped entirely around the article, or to laminate a target between layers of a cardboard package. The methods and devices used to carry out these proposals have been article specific, and lacked widespread utility.

The prior art has further experienced problems with the production of static electric charge when dispensing targets, particularly disposable paper targets, where the targets having pressure sensitive adhesive thereon that are dispensed by peeling them from a continuous web. The sudden discharge of such static charge can destroy the EAS target circuits.

Accordingly, there has been a need for application of targets to articles that do not obscure or otherwise interfere with the labeling marking of the articles, and particularly, for concealing the target on the article.

SUMMARY OF THE INVENTION

A primary objective of the present invention is to provide a method of affixing an EAS or EAM target or marker to an article in such a way that it interferes very little with the appearance of the article or the article labeling. A more particular objective of the present invention is to affix such a target or marker to an article so that the target or marker is concealed.

A further objective of the present invention is to provide a method and apparatus for affixing an electronic article security target to an article, particularly in a concealed or other manner in which the target does not interfere with the appearance of the article or the article labeling, and to provide a method and apparatus for manufacturing such a target in combination with the article and label, and for affixing the combination to the article.

A more particular objective of the present invention is to combine such a target with labels, particularly pressure sensitive adhesive labels, and further to provide articles having such target/label combinations, as well as to provide an EAS or EAM system based on articles having such target and label combinations.

Additional objectives of the present invention are to provide a method and apparatus for manufacturing combined targets and labels and for applying target and label combinations to articles, particularly without damaging the targets.

Based on the principles of the present invention there is provided a flat electronic article security target and label combination for affixation to articles with adhesive, particularly adhesive of the pressure sensitive type. In its preferred embodiment, the combination target and label includes labels having pressure sensitive adhesive thereon, and having, on the adhesive side thereof, a flat electronic article security target that is preferably smaller than, and is surrounded on all edges by, the label.

Further according to certain embodiments of the present invention, articles are provided with labels affixed thereto with an electronic article security target concealed beneath and held, in combination with the label, preferably by pressure sensitive adhesive, to the article. According to certain embodiments of the present invention, a plurality of articles that include a combination of a label and target held by pressure sensitive adhesive to the article is provided in an EAS, EAM or other electronic article security system in further combination with a transmitter, receiver and alarm device of the electronic article security system. In such a further combination, many but not necessarily all of the articles are provided with such target and label combinations.

According to the preferred embodiment of the invention, a supply of such target-label combinations is provided arranged in a line or array on a removable backing strip, preferably a web, from which the combinations can be peeled for transfer onto articles.

According to other principles of the present invention, a method and apparatus are provided in which a combination of a pressure sensitive label and electronic article security target or mark is applied to each of a plurality of articles by peeling the combinations from a backing strip that is directed, in the application process, around rollers of diameter sufficiently large, preferably at least three inches, and more preferably, about four and one half inches, so as to prevent wrinkling or destructive bending of the target or label. Preferably also there is provided structure for removing static electric charge, which could otherwise damage the target circuit, from, or managing the charge on, the combination, as the label is being applied to the article.

According to still other principles of the present invention, there are provided a method and apparatus for forming supplies of electronic article security target and pressure sensitive label combinations, preferably onto backing strips that are preferably in the form of a web.

According to one embodiment of such method and apparatus for forming a supply of combination targets and labels, a supply of targets and a supply of individually cut preprinted labels, each adhered by pressure sensitive adhesive to a respective web, are combined to form a supply of labels and target laminates on one such web. Preferably, the labels are peeled from their web at a peeling station, which web is then directed around an intermediate path and back to the peeling station, and then reapplied to the web portion that has been directed around the intermediate path. Along the intermediate path, the targets are sequentially dispensed from their backing web onto the label web in such positions that they will be covered by the labels that are reapplied to the label web. The targets so dispensed may be spaced such that one is combined with each label or such that one is combined with only selected ones of the labels that are reapplied to the label web. This method and apparatus are particularly useful in inserting targets under the manufacturer's or retailer's pre-printed labels.

According to another embodiment of the method and apparatus for forming a supply of combination targets and labels, a supply of targets and a web supply of uncut preprinted labels, adhered by pressure sensitive adhesive to a respective web, are combined to form a supply of label and target laminates on one such web. Preferably, the backing strip or web is peeled from the labels, leaving a web of uncut labels. The label web is then directed around a path through a target application station, at which targets are sequentially dispensed from their backing web onto the pressure sensitive adhesive side of the label web in such positions that they will be covered by the labels, which are then reunited with the label backing web. The targets so placed may be spaced such that one is combined with each uncut label or such that one is combined with only selected ones of the uncut labels that form the label web. In an alternative version of this embodiment, the supply of targets may be from a stack of non-adhesive targets, which are fed onto adhesive side of the label web. This method and apparatus are particularly useful for the high speed manufacturing of combination markers in conjunction with a label printing and die cutting process.

In another embodiment of such method and apparatus for forming a combination of targets and labels, separate supplies of targets and of preprinted labels, each adhered by pressure sensitive adhesive to a respective web, are combined to form combination label and target laminates directly on the articles. Preferably, the pressure sensitive targets are peeled from their web and dispensed onto articles presented on a conveyor through a target application station. Then, as the conveyor carries the articles with the targets applied through a label application station, the labels are peeled from their web and applied to the articles overlying the preapplied targets. The targets dispensed in this manner may be applied selectively to articles so that one is combined with each label or with only selected ones of the labels on selected ones of the articles.

In the combination label and target forming method and apparatus, there are preferably also provided elements to prevent static electricity discharge that could damage the circuits of the targets. Generally, feeding of the webs and peeling of targets or labels therefrom generates a static electric charge that builds up on the web. To prevent damaging currents that could result by discharge of such charge, the surfaces carrying target bearing webs in the combination label forming structures are provided with non-electrically conductive material, preferably an insulating plastic such as Debrin®. In addition, ionized gas is preferably directed at various points along the lengths of the web, such as immediately downstream of peeling and at other spaced points along the webs, to gradually neutralize charge on the targets.

In addition, in the forming of label and target combinations and in the application of the labels, targets and combinations thereof to articles, the pressing thereof to the articles or to a web may be carried out by rollers, air jets or reciprocating tamping devices.

These and other objectives and advantages of the present invention will be more readily apparent from the following detailed description of the figures and preferred embodiments, in which:

BRIEF DESCRIPTION OF THE DRAWINGS:

FIG. 1 is a perspective view of one embodiment of an article of merchandise having a combination label and electronic article security target thereon according to the principles of the present invention.

FIG. 1A is a diagrammatic illustration of an Electronic Article Security system (EAS) of one type that may use articles of merchandise provided with the target and label combinations of FIG. 1.

FIG. 2 is a perspective view of a supply of label and target combinations, according to one embodiment of the present invention, for use in making articles of the type illustrated in FIG. 1.

FIG. 4A is a perspective view of an alternative embodiment of the target feeding portion of the apparatus of FIG. 4.

FIG. 4B is a perspective view of another alternative embodiment of the target feeding portion of the apparatus of FIG. 4.

FIG. 4C is a perspective view of a further alternative embodiment of the target feeding portion of the apparatus of FIG. 4.

Figure 3:
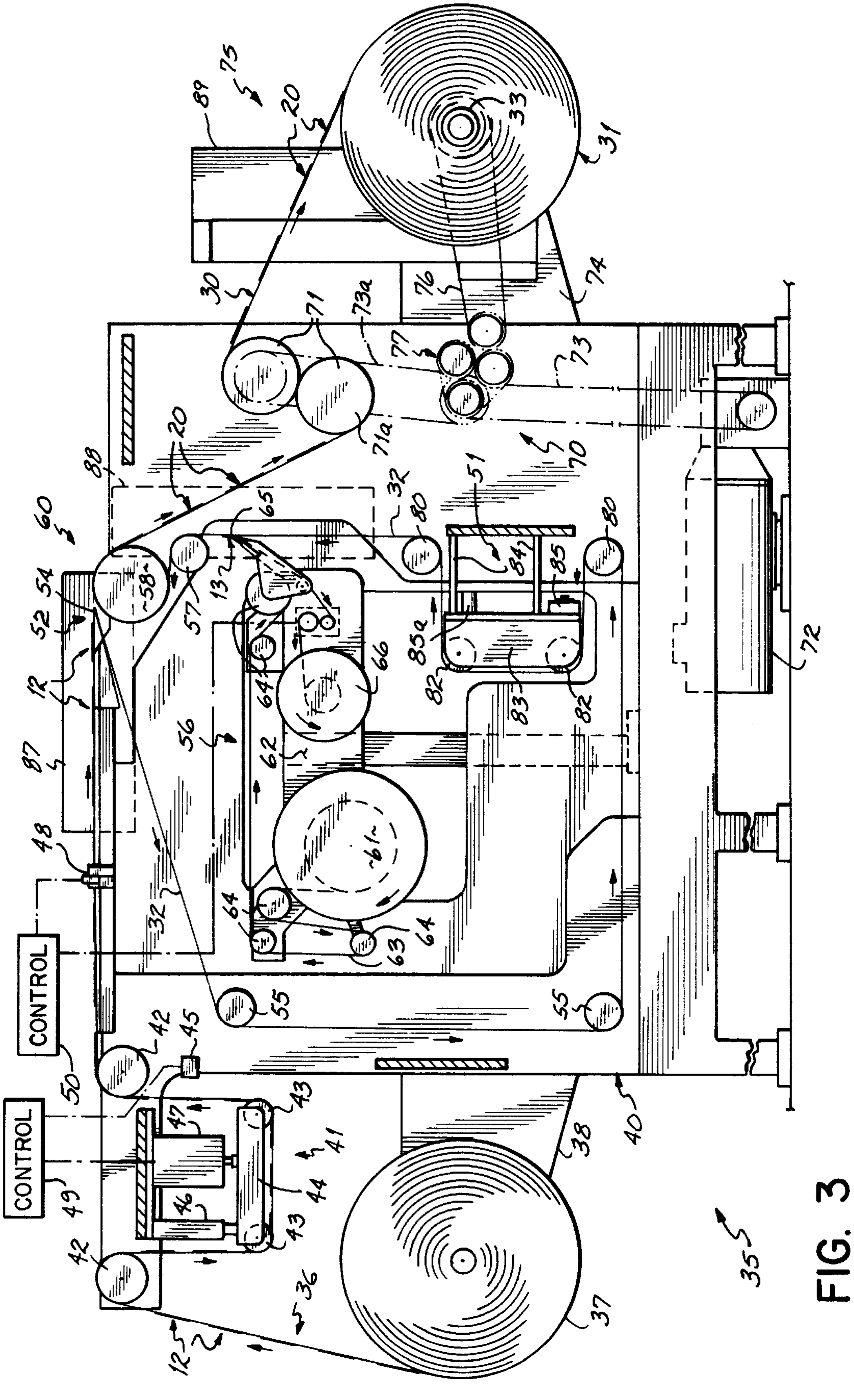
FIG. 3 is a side elevational view of one embodiment of an apparatus, according to the present invention, for forming the supply of label and target combinations of FIG. 2.

DETAILED DESCRIPTION OF THE PREFERRED EMBODIMENTS:

FIG. 1 illustrates a marked article of merchandise 10, that includes, for example, a product or product container 11, such as a plastic bottle of motor oil, having a product identifying label 12 thereon. Between the product 11 and the label 12 is a disposable paper target 13 formed as a thin flat flexible laminated sheet that includes a circuit designed in for use in an Electronic Article Security system (EAS) 14 as diagrammatically illustrated in FIG. 1A. The label 12 is preferably a printed label formed of a paper or other thin sheet material 15, having printed graphics, text or other indicia 16 printed thereon, secured to the product or container 11 with layer adhesive 17, preferably pressure sensitive, usually coated on the underside of the label prior to its application to the product 11. The target 13 is a multi-layered sheet material 18 having a circuit therein (not shown) that usually includes a printed circuit conductive strip, part of which functions as an antenna and part of which functions as a receiver and transmitter. The antenna of the circuit picks up energy from a signal generated by a transmitter at a store exit, which energizes for example, an L-C part of the circuit, causing it to reradiate energy of a certain frequency and in effect passively retransmit a signal which is detected by a receiver also at the store exit. The target 13 may also be provided with adhesive 19, also preferably pressure sensitive, to secure it directly to the product 11, or it may be indirectly secured to the product 11 by being directly adhered to the overlying label 12 via adhesives 17, which label is then adhered to the product by adhesive 17. The label 12 is preferably larger than the target 13 and contacts the product 1 1 over an area, preferably at least one quarter inch wide, around the entire periphery of the target 13. The combination of the target 13 and label 12 are sometimes herein referred to the combination marker 20.

As illustrated in Fig. IA, the system 14 is typically a retail store having an inventory of marked articles 10, which are products 11 marked with the combination markers 20. The inventory may also include articles 10*a* that include similar products 11 that have fixed to them only labels 12, without the underlying targets 13. Since the targets 13 are concealed beneath the labels 12, a typical customer will not be able to readily determine which, or whether, products are marked with an EAM target 13. The inventory may also include articles 10*b* packaged more than one to a carton containing pluralities of articles, only some of which are marked with targets 13. The EAM system typically includes a transmitting and receiving device 21 at each of the exits of the facility.

The device 21 is provided with a transmitter 22 that emits a signal that will be detected by an activated target 13 in proximity thereto, which causes the target 13 to alter the field in the vicinity thereof or otherwise to emit a signal that is detected by a receiver 23 in the device 21, which causes the receiver to activate an alarm 24 that is connected to the device 21.

Targets of a reusable type are removed from articles at a check-out counter 25 in the facility employing the system 14. With the targets removed from the articles, authorized removal of the articles from the facility does not cause the device 21 to activate the alarm 24. For systems 14 that use disposable targets, the check-out counter 25 is provided with circuitry that deactivates the target 13. The deactivation can be brought about by a deactivation device 26 located at a store checkout lane, and may, for example, be operated while the article is being scanned by a bar code reading device 26 at the check-out counter 25. The deactivation device 26 may be included in a plate over which the article is passed, and generate a signal to overload the circuit in the target 13, which can include a fusable element or other element that would short out or otherwise become permanently disabled in response to such overload. When this occurs, the customer is free to pass through the exit without activating the alarm 24. The combination markers 20 of the present invention are preferably of this non-reusable type.

Combination markers 20 according to the preferred embodiment of the present invention are preferably supplied on a web supply 30, wound on a roll 31, and that includes a plurality of peel-off combination markers 20 adhered to a continuous web of backing material 32, which is releasable from the pressure sensitive adhesive of the layer 17 on the underside of the labels 12 and of the layer 19, if any, on the underside of the target 13. Such a web supply 30 is illustrated in FIG. 2. The web of backing material 32 has a release coating or other surface forming material, which permits labels held thereto with pressure sensitive adhesive to be peeled off without the adhesive being removed from the label or remaining on the backing material. The roll 31 is provided with a core or spool 33 that is at least three inches in diameter, and preferably six inches in diameter, to reduce the stretching of the labels and the tendency of the labels to wrinkle as the web supply 30 is fed through an applying device. The markers 20 may be arranged on the backing material web 32 in a single row, as illustrated, or in an array of several rows side-by-side on the web backing material 32.

An apparatus 35 for manufacturing a web supply 30 of markers 20 is illustrated in FIG. 3. The apparatus 35 combines preprinted die-cut labels 12 arranged on a web of backing material 32 to constitute a label supply web 36 wound on a supply roll 37 that is rotatably mounted on a bracket 38 rigidly supported on frame 40 of the apparatus 35. The labels 12 are held to the backing material web 32 by the layer of pressure sensitive adhesive 17 on the backs thereof (FIG. 2). From the roll 37, the web 36 of labels 12 feeds through a transverse registration adjusting mechanism 41, which includes a pair of spaced rollers 42, rotatably mounted on the frame 40, and a pair of path direction controlling rollers 43, which are rotatably mounted on a moveable carriage 44. The carriage 44 is pivotally supported at one end thereof on a post 46 fixed to the frame 40. The carriage 44 is also linked to an output of an adjustment actuator 47, which, when energized, pivots the carriage 44 about the post 46, changing the direction of the path of the label supply web 36 between the rollers 42. A sensor 45, fixed to the frame 40 along the path of the web 36 downstream from the adjusting mechanism 41, provides information to a controller 49 in response to which the controller 49 sends a control signal to the actuator 47 to pivot the carriage 44 make an adjustment that centers the web 36 on the downstream one of the rollers 42. The sensor 45 may be an air sensor, an optical sensor or other type of sensor that senses a side edge of the web 36.

Immediately downstream of the transverse registration adjusting mechanism 41 is located longitudinal registration sensor 48. The sensor 48 detects the presence of a label 12 on the backing material web 32, and thus can detect the leading and trailing edges of the labels 12 along the web 32 of backing material, which is semi-transparent and through which a beam of light can be passed for detection by the sensor 48. The sensor 48 is connected to the input of a control circuit 50 which generates an output signal in response to an input signal from the sensor 48 to control the feeding of targets 13 onto the web 32, as explained more fully below.

The peeling station 52 includes a knife edge type label peeler blade 54. At the peeling station 52, a label 12 is peeled from the web 32, which is directed around a set of guide rollers 55, through the second adjustment mechanism 51, adjacent a target dispensing and inserting device or station 56, around a further guide roller 57, and around a backing roller 58 of a combining station 60. As the web 32 passes the target dispensing device 56, a target 13 is applied to the backing web 32, from which labels 12 have been removed. At the combining station 60, a label 12 that was peeled from the web 32 at the peeling station 52 is reapplied to the web 32 overlying and surrounding an applied target 13.

The target dispensing device 56 supports a target supply roll 61, rotatably mounted to the frame 62 of the device 56, which is rigidly supported on the frame 40 of the apparatus 35. On the supply roll 61 is a web of target backing material 63 on which are affixed a series of targets 13, held thereto by the layer of pressure sensitive adhesive 19 on the backs thereof (FIG. 2). The target dispensing device 56 is similar to a conventional pressure sensitive label dispensing devices with one exception being that web guide rollers 64 and knife edge peeling blade 65 are formed of, or at least coated with, a non-electrically conductive material, preferably a plastic such as Delrin®. The web 63 carrying the targets 13 is thereby maintained out of contact with electrically conductive material so that electrostatic charge, which develops when webs of material are fed and pressure sensitive adhesive attached surfaces are peeled apart, does not discharge rapidly and thereby damage the circuitry of the targets 13.

In the dispensing device 56, the web 63 carrying targets 13 feeds from the roll 61 along rollers 64 and around the knife edge peeler blade 65, where the targets 13 are separated from the web 63, and onto a web take-up roll 66. At the blade 65, the targets 13 are transferred from the web 63 onto the label backing web 32, upstream of the combining station 60. The targets 13 may be placed at every label position on the web 32 or may be positioned at selective label positions along the web 32, such as every third, fourth or fifth label, whereby either every label 12 or a selected fraction of all of the labels 12 may be made into combination markers 20. The web 32, with targets 13 thereon, advances from adjacent the dispensing device 56 around the roller 57, which is also non-conductive, and around the further non-conductive roller 58 of the combining station 60, where the labels 12 being sequentially peeled from the web 32 at the blade 54 of the label peeling station 52 are reapplied to the web 32 to overlie the targets 13 that were applied to the web 32 by the target dispensing device 56, thus forming the marker supply web 30.

The web 32 is pulled through the apparatus 35 by a web drive assembly 70, which includes a pair of drive rollers 71, preferably of a high resistance conductive rubber, rotatably mounted on the frame 40, and drive motor 72, which has an output drive belts 73 and 73a linked to the rollers 71. The motor 72 turns the rollers 71, which maintains sufficient frictional contact with the web supply 30 to pull the web 32 through the apparatus 35, including pulling label supply web 36 from the web supply roll 37. The rollers 71 are preferably larger diameter rollers, particularly the roller 71a that contacts the label side of the web 30, where wrinkling of the label due to longitudinal compression is likely to occur.

The marker supply web 30 is wound onto a large diameter supply roll 33, preferably a six inch roller, which is rotatably supported on a bracket 74 that is fixed to the frame 40 of the apparatus 35 at a rewinding station 75. The roll 33 is rotated by belts 76 linked through a gear reversing system 77 to the drive belts 73 and 73*a*.

The registration of the label 12 relative to a target 13 at the combining station 60 is achieved by operation of the dispensing device 56 in response to a trigger signal from the output of the control circuit 50. The placement of the targets 13 on the web 32 by the dispensing device 56 should place the targets 13 such that they are completely covered by the labels 12, preferably leaving at least about ⅛th of an inch of label 12 in contact with the web 32 around the entire target 13. The position of the sensor 48 on the frame 40 can be adjusted to control the amount of overlap of the label 12 on the web 32 at the leading and trailing edges of the target 13. What is acceptable registration will, to some degree, be affected by the nature of the labels 12 and the relative dimensions between the labels 12 and the targets 13. Additionally, the positions of the leading and trailing edges of the targets 13 may be adjusted by this adjustment of the sensor 48 so as to coincide with images on the labels 12 that are most likely to obscure or at least partially hide the presence of the target 13 under the label 12.

The adjusting mechanism 51 is, like the transverse registration mechanism 41, also a transverse adjusting mechanism. Its purpose is to transversely position the web 32 so that labels 12, peeled at the peeling station 52, are transversely centered when they are reapplied to the web 32 at the combining station 60. The adjusting station 51 includes a pair of rollers 80 that are rotatably mounted on the frame 40 of the apparatus 35. The mechanism 51 further includes a pair of rollers 82 rotatably mounted to a moveable carriage 83, mounted to rods 84. The carriage 83 may be in the form of an automatic adjusting mechanism such as transverse registration mechanism 41, or may be a manual adjustment mechanism by which the transverse position of the web 32 is occasionally set for feeding into the combining station 60. The adjustment of the mechanism 51 is made by pivoting the carriage 83 on pivot mounting 85 by operation of an adjustment element 85*a*.

Elements 57, 58, 64, 65 and 71 are made of non-electrically conductive material to prevent sudden static discharge as previously described; it is preferred that static charge dissipation devices be employed to deplete the static charge in a controlled manner from the web 32. Such devices, including ionized gas source devices 87, 88 and 89, are provided adjacent the web 32 at the combining station 60, the target inserting station 56 and the rewinding station 75, respectively. The devices 87–89 direct controlled amounts of ionized gas onto the web 32 so as to gradually neutralize static charge that may form on the web 32 at a rate sufficiently low to avoid currents that would damage the circuitry of the targets 13.

Figure 4:
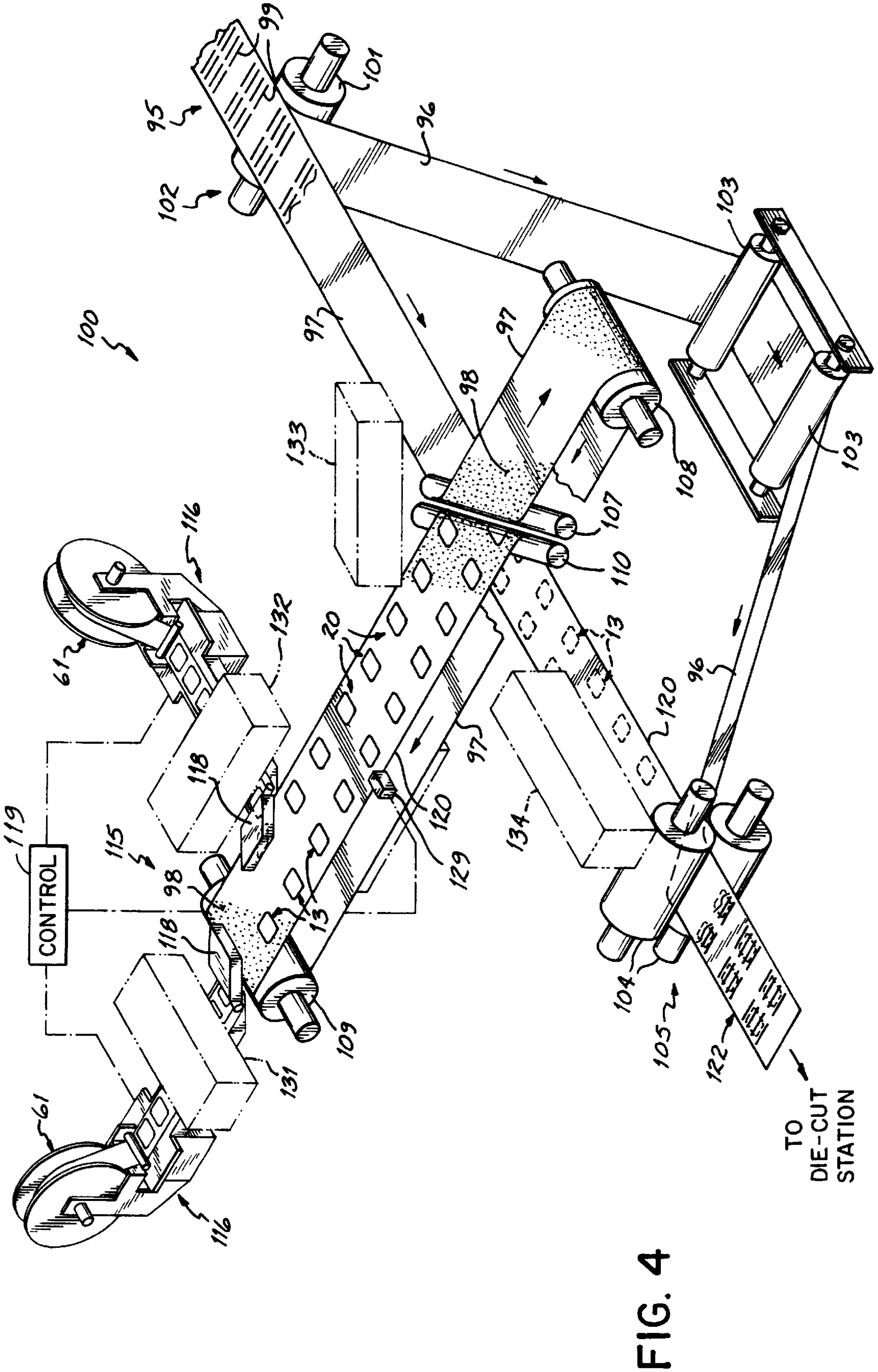
FIG. 4 is a perspective diagram of an alternative embodiment of the apparatus of FIG. 3.

While the apparatus 35 of FIG. 3 is capable of manufacturing supplies 30 of combination markers 20 in conjunction with a label printing and cutting processes and also is capable of inserting targets 13 beneath preprinted labels that have been previously provided on backing liner webs, alternative apparatus 100, illustrated in FIG. 4, combines the printing and die-cutting of the labels 12 with addition of the targets 13 in a single high speed operation. Referring to FIG. 4, a multi-layered web 95 is shown advancing downstream from a label printing machine (not shown). The web 95 includes a web of backing material 96, similar to the web 32 in FIGS. 2 and 3, but differing in that the label web 97 is not die-cut. A web of label material 97, of the same width as the web 96, is affixed to the web 96 by a layer of pressure sensitive adhesive 98 on the underside of the label material 97. Printed on the topside of the label material 97 is a single row or an array of label images 99, arranged side-by-side in a plurality of rows as illustrated. The web 95 may feed directly from the label printer, or from an intermediate supply roll, into a combination marker forming apparatus 100.

The apparatus 100 includes a guide roller 101 at the input 102 thereof over which is directed the web 95 composed of the backing liner web 96 and the printed label web 97. In the setup of the apparatus 100, the two web components 96 and 97 of the web 95 are separated at the roller 101 and the backing material web 96 is directed around bypass web guide 103 and from there between a pair of combining rollers 104 at the output 105 of the apparatus 100. The web guide 103 may be similar to the transverse registration adjustment mechanism 41 of the apparatus 35 of FIG. 3, but is preferably in the form of the manual adjustment mechanism 51 of the apparatus 35. The label web 97 is directed around an inverting roller 107, which turns the web 97 from an orientation in which the side on which the labels 99 are printed faces upward to an orientation in which the adhesive layer 98 faces upward. In the inversion process, the web 97 is also turned at an angle to the path of the web 95, which was a straight line from the input 102 to the output 105 of the apparatus 100. The web 96 is then again inverted around roller 108 passed another roller 109 on the opposite side of the apparatus 100 where it is inverted again. From there, the web 97 continues to advance, with the adhesive layer 98 facing upward, toward a final inverting roller 110 around which the web 97 is inverted and brought back into alignment with the original path of the web 95. From the roller 110 the web 97 proceeds to the combining rollers 104 between which it is recombined with the backing material web 96.

Along the path of the web 97, immediately downstream of the roller 109, is a target dispensing and application station 115, at which one or more target dispensing and application devices 116 are situated adjacent the web 97. The devices 116 accept targets 13 from a supply roll 61, as in FIG. 3, peeling the targets 13 from backing material web 63. The devices 116 may be in the form of the devices 56 of FIG. 3, but are preferably equipped with blow-on pneumatic applicators 118, which direct blasts of air onto the targets 13 as they are peeled from the web 63, forcing them into contact with the adhesive layer 98 on the upwardly facing side of the web 97. As illustrated, the targets are urged by the air blast to contact the web 97 with the adhesive side of the targets 13 in contact with the adhesive 98 on the web 97.

For certain applications of the invention, it may be desirable to apply the targets 13 with the non-adhesive side of the target against the adhesive side of the label web 97. For such an application, targets 13 are peeled and applied to the adhesive layer 98 of the label web 97 without being allowed to stick to elements that would contact the adhesive side of the targets 13. The pneumatic applicators 118 may be adapted to blow the targets into contact with the adhesive layer 98 where the target dispensers 116 are inverted to peel targets 13 from the web facing the air jets of the applicators 118, with the non-adhesive side of the targets 13 in contact with the adhesive 98. Alternatively, rollers or tamping devices may be used having non-stick surfaces that would guide the adhesive side of the targets 13 to press the targets 13 into contact with the adhesive layer 98 of the label web 97.

Preferably more than one dispensing device 116 directs a plurality of rows of targets 13 onto the web 97 forming a target bearing portion 120 of the web 97. The dispensing of targets is preferably synchronized with the positions of the printed labels on the web 97 by a controller 119 in response to signals from an optical or other sensor 129 that reads, for example, registration marks made in the label printing process. The target bearing portion 120 of web 97 is, in effect, an interconnected sequence of target and label combinations 20 disposed in a multi-row array. This web portion 120 advances around the inverting roller 110 and between the combining rollers 104 where it is laminated onto the original backing material web 96, forming an intermediate web 122 that is a combination of the web 120 and the liner 96. This intermediate web 122 is advanced further downstream to a take-up roller (not shown) or directly to a die cutter (not shown) where the labels 12 of the combinations 20 are die cut from the component label web 97, to form the web supply 30 described in connection with FIG. 2.

As with the apparatus 35 of FIG. 3, the apparatus 100 of FIG. 4 is provided with non-electrically conductive surfaces on the rollers and knife edge peelers of the devices 116 as well as on the rollers 107, 110 and 104. Further, ionized gas dispensing devices 131–134 are provided at the target dispensing devices 116 and at other points along the webs, such as at the rollers 107, 110 and 104, to deplete static electric charge that might build up on the webs. Furthermore, any additional rollers or curvatures around which the web supply 30 will pass downstream of the combining station 105 will be provided with diameters of at least about 2½ inches, and preferably about 4¼ inches, with diameters of double these amounts being even more preferable, to prevent wrinkling or stretching of the labels 12 when overlying targets 13 on the web 32 of the marker supply 30.

In the apparatus 100 of FIG. 4, alternative target feeding or dispensing devices 116 are contemplated, such as those illustrated in FIGS. 4A, 4B and 4C. In FIG. 4A, a device **116*a* utilizes a pneumatic applicator to apply targets 13*a* having no adhesive layer. Such targets 13a are supplied in a stack, rather than on a web, and fed from a magazine 141 onto the adhesive side 98*a* of a preprinted label web 97*a*. The device 116*a* is capable of high speed operation. FIG. 4B illustrates a target dispensing device 116*b* employing a mechanical press-on applicator 142 for pressing the peeled targets 13 from web supply 61, with the adhesive bearing side of the targets 13 in contact with the adhesive layer 98*a* on the backing material web 97*a*. FIG. 4C illustrates a target dispensing device 116*c* employing a mechanical roll-on applicator 143 for pressing the peeled targets 13 from the web supply 61. The device 116***c* also applies the targets 13 with the adhesive bearing side thereof in contact with the adhesive layer 98*a* on the backing material web 97*a*.

Figure 5:
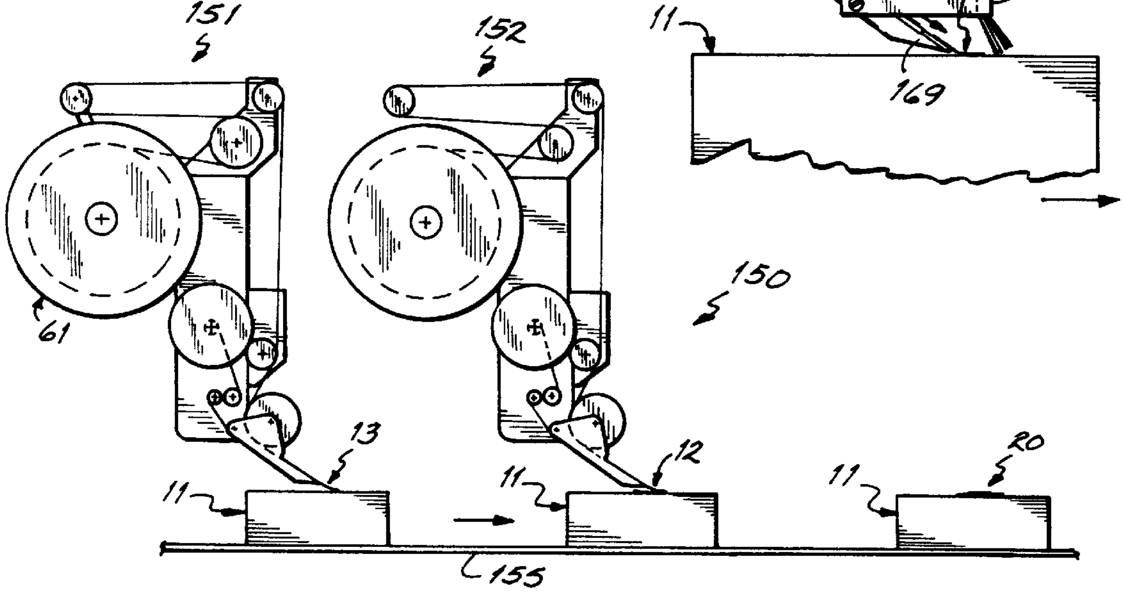
FIG. 5 a side elevational view of an alternative apparatus those of FIGS. 3 and 4 for forming articles of the type illustrated in FIG. 1.

FIG. 5 illustrates an apparatus 150 having an arrangement by which combination markers 20 are formed directly on products 11 by application first of a target 13 with a target dispensing device 151 and then the application of a label 12 over the target 13 with a label dispensing device 152. The target dispensing device 151 may be in the form of the device 56 of the apparatus 35 of FIG. 3, or any of the devices of FIGS. 4, 4B or 4C by which adhesive coated targets 13 are peeled from a backing web 63 from a supply roll 61. In the apparatus 150, the dispensing devices 151 and 152 are spaced along a conveyor 155 that carries products 11 first past the target dispensing device 151, at which a target 13 is applied to the product 11 or to its package, and then past the label dispensing device 152 by which a preprinted label is dispensed over the target 13 on the product 11. Such an apparatus 150 produces marked articles 10*a* similar to those illustrated in FIG. 1.

With any of the embodiments of FIGS. 3, 4 or 5, the printing on the labels and the positioning of the markers beneath the labels can be coordinated so that any tendency of the edge of the marker to be visible on the surface of the label, when the label is applied to the product, is minimized.

Figure 6:
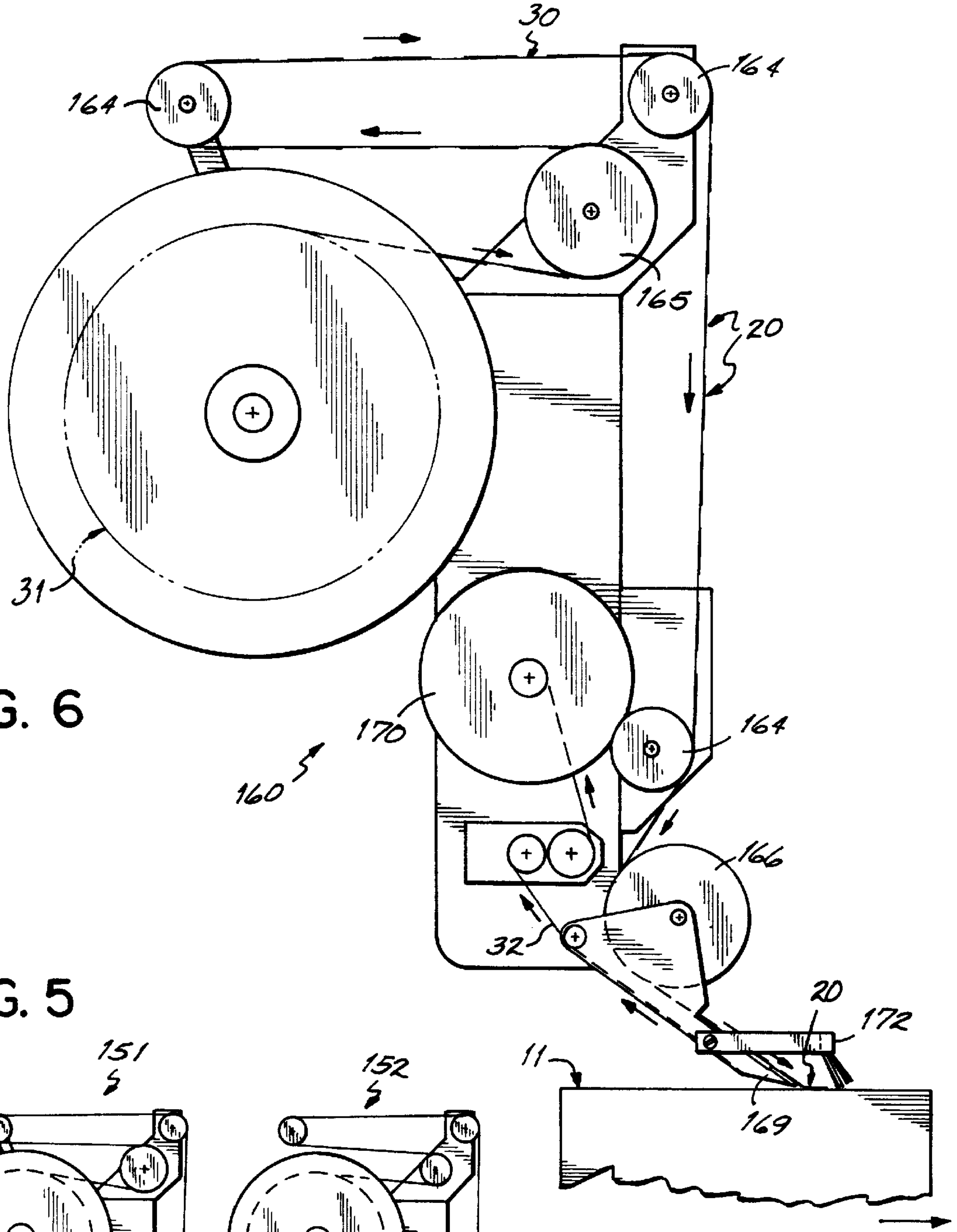
FIG. 6 is a side elevational view of an alternative apparatus to that of FIG. 5 for applying combinations from a supply in the form of that of FIG. 2 for forming articles of the type illustrated in FIG. 1.

Production of articles 10 or 10*a* by application of combination markers 20 preassembled on a supply web 30 is carried out by a combination marker application apparatus 160, as illustrated in FIG. 6. The apparatus 160 is similar to dispensing devices 151 and 152 of FIG. 5, but supports a supply roll 31 of the marker supply web 30 carrying the combination markers 20. In the apparatus 160, the web 30 proceeds around a series of rollers 164, 165 and 166 that have non-conductive surfaces. Of the series, rollers 164 contact the backing material side of the web 30. The web 30, however, passes around the rollers 165 and 166 in a reverse direction, with the rollers contacting the preprinted labels 12.

The rollers 165 and 166 have diameters of preferably about 4½ inches, or at least three inches, so as to avoid the wrinkling of the labels 12 that could be caused by the fact that the web 32 does not stretch as it passes around the rollers 165, 166 where the labels 12 between the web 32 and the roller surfaces, which is at a slightly shorter radius from the axis of the rollers 165, 166. The web 32 also passes around the tip of non-metallic peeler blade 169, which peels the combination marker 20 from the web 32, and then passes onto take-up roll 170. The combination marker 20 peeled from the web 32 at the blade 169, with its adhesive side facing a product 11 on a conveyor (not shown), becomes affixed, with the aid of slight pressure from a roller or brush attachment 172 similar to that of FIG. 4A, to the surface of the product 11 forming a marked article 10*a*. In the alternative, a tamp on device such as illustrated in FIG. 4*b* or the air pressure device of FIG. 4 can be used to apply the combination markers 20 from the supply 30 to the products 11 to form the marked articles 10.

Other embodiments of combination markers and the supplies thereof can be made by selective location of pressure sensitive adhesive. For example, combining targets 13 with pressure sensitive adhesive thereon with labels 12 having pressure sensitive adhesive only around the edges thereof can be achieved directly on the products 11 by the apparatus 150 of FIG. 5. Further, by using the apparatus 150 to dispense targets 13 and labels 12, with adhesive only on the edges thereof, onto a web of backing material 32, supplies of combination markers can be formed having no adhesive between the target 13 and the label 12. Such supplies may also be formed by applying pressure adhesive onto a release layer on a backing material web, then dispensing targets 13, then labels 12, onto the adhesive layer of the web using dispensing devices of the type illustrated in FIG. 4A. When such combination markers are peeled from the web upon application to articles with the apparatus of FIG. 6, the adhesive transfers to the label and target and is released from the web.

From the above detailed description of the details of the illustrated embodiments of the invention, it will be apparent to those skilled in the art that various modifications and additions may be made thereto without departing from the principles of the present invention. Therefore, the following is claimed:

What is claimed is:

1. A method of manufacturing an article marked with a combination marker, the method comprising the steps of:

providing a web supply of combination markers held by adhesive to a web of backing material, each marker including a preprinted label having a pressure sensitive adhesive on one side thereof securing the label to the web of backing material and resonant circuit electronic article security system target smaller than the label adhesively secured to the label between the web and the target with the label in adhesive contact with the web of backing material around the perimeter of the target;

peeling a combination marker from the web of backing material;

providing an article to be marked; and applying the peeled combination marker to the article with the pressure sensitive adhesive on the label at least partially securing the label to the article around the perimeter of the target; and during the peeling and applying steps, electrically insulating target bearing surfaces and exposing the target and such surfaces to ionized gas.

2. A method of forming mounted label and target combinations for use in an electronic article security system wherein the mounted label and target combinations each include a substrate, a printed label having indicia on a front surface thereof and having pressure sensitive adhesive on a back surface thereof securing the label to the substrate, and a thin flat electronic article security target secured between the label and the substrate, the method comprising the steps of:

providing a label-bearing web having a web layer of backing material and a layer of preprinted pressure sensitive labels each having a preprinted image on the front thereof and pressure sensitive adhesive on the back thereof securing the label to the web layer of backing material of the label-bearing web;

separating the labels from the web layer of backing material;

providing a plurality of electronic article security targets each having a circuit therein that is capable of being disabled by an electronic article security system;

securing each of the separated labels to the substrate with each target secured between the substrate and the pressure sensitive adhesive on one of the labels with the label in adhesive contact with the substrate; and while securing the labels to the substrate with a target between the labels and the substrate, controlling electrostatic charge on the target so as to prevent rapid discharge damaging to the target by contacting a web bearing the target with materials having electrical conduction properties selected so as to gradually remove charge from the target to prevent damage of the target by the rapid discharge of electricity.

3. The method of claim 2 used for manufacturing a combination marker supply, wherein:

the target providing step includes the step of providing a target-bearing web including a backing layer formed of the substrate and including a layer of discrete thin flat electronic article security targets, the targets each having pressure sensitive adhesive on one side thereof securing the target to the substrate; and the label securing step includes the step of securing the separated labels to the target-bearing web with one label overlying each target and the pressure sensitive adhesive on the label in adhesive contact with the substrate.

4. The method of claim 2 in a method for manufacturing a combination marker supply, wherein:

the label-bearing web providing step includes the step of providing the label-bearing web having the web layer of backing material and a web layer of preprinted pressure sensitive labels with pressure sensitive adhesive on the back thereof securing the web layer of labels to the web layer of backing material;

the separating step includes the step of separating the web layers;

the securing step includes the step of serially securing a plurality of the targets to the back of the web layer of labels and then securing the separated web layer of labels to the substrate with targets between the web layers; and the substrate is a web layer of backing material.

5. The method of claim 2 in a method for manufacturing marked articles, wherein:

the substrate includes a plurality of articles to be protected;

the securing step includes the steps of adhesively securing each target to an article, and securing each label to the article with the label overlying a target and having the pressure sensitive adhesive on the label in contact with the article and the target.

6. The method of claim 2 in a method of manufacturing a combination marker supply, wherein:

the substrate includes a plurality of articles to be protected;

the label bearing web and target providing steps include the steps of providing a web supply of combination markers held by adhesive to a web of backing material, each marker including a preprinted label having a pressure sensitive adhesive on one side thereof securing the label to the web of backing material and to a label that is smaller than the label and is adhesively secured to the label between the web and the target;

the separating step includes the step of peeling a combination marker from the web of backing material; and the securing step includes the step of applying a peeled combination marker to the article with the pressure sensitive adhesive on the label at least partially securing the label to the article.

7. The method of claim 2 wherein the contacting step includes the steps of:

moving a web layer of backing material on web guides of non-electrically conductive material after targets have been applied thereto; and directing an ionized gas toward the moving web layer to reduce electrostatic charge thereon.

8. The method of claim 2 wherein the contacting step includes the steps of:

directing a web having targets secured thereto over a plurality of rollers having surfaces of non-electrically conductive material and at least one roller which contacts the side of the web to which the labels are secured having a diameter of at least three inches.

9. The method of claim 8 wherein:

the directing step includes the step of directing the web over the at least one roller having a diameter of at least approximately 4½ inches.

10. The method of claim 8 further comprising the steps of:

directing ionized gas at the label and target combinations to reduce electrostatic charge thereon.

11. The method of claim 2 wherein the contacting step includes the steps of:

directing ionized gas at the label and target combinations to reduce electrostatic charge thereon.

12. The method of claim 2 wherein the contacting step includes the steps of:

directing a web targets secured thereto over having surfaces of only electrically substantially non-conductive material to retard discharge of electricity.

13. A method of manufacturing a web of label and target combinations for use with articles to be protected in an electronic article security system, the method comprising the steps of:

separating from a web of backing material a plurality of preprinted labels having pressure sensitive adhesive on one side thereof that joins the labels to the backing material web;

securing together, with the pressure sensitive adhesive that is on the one side of the labels, a label layer that includes the separated labels and a web layer that includes a web of backing material;

adhesively applying, with pressure sensitive adhesive, a plurality of thin flat electronic article security targets to one of the layers before the layers are secured together, so that each target is laminated between one of the labels of the label layer and the web layer;

moving a web layer of backing material on web guides of non-electrically conductive material after targets have been applied thereto; and directing an ionized gas toward the moving web layer to reduce electrostatic charge thereon.

14. A method of applying label and target combinations from a web of backing material onto articles to be protected in an electronic article security system, the method comprising the steps of:

separating the combinations from the web of backing material by passing the web over a knife edge peeling device having a surface of electrically non-conductive material;

directing the web with the combinations secured thereto by pressure sensitive adhesive from a roll supply, over a plurality of rollers having surfaces of electrically non-conductive material and at least one roller which contacts the side of the web to which the labels are secured having a diameter of at least three inches.

15. The method of claim 14 wherein:

the directing step includes the step of directing the web over the at least one roller having a diameter of at least approximately 4½ inches.

16. The method of claim 14 further comprising the steps of:

directing ionized gas at the label and target combinations to reduce electrostatic charge thereon.

* * * * *

UNITED STATES PATENT AND TRADEMARK OFFICE

CERTIFICATE OF CORRECTION

PATENT NO. : 6,123,796
DATED : September 26, 2000
INVENTOR(S) : Kathmann et al.

It is certified that error appears in the above-identified patent and that said Letters Patent is hereby corrected as shown below:

Column 1,
Line 39 should not start a new paragraph.

Column 4,
Line 13, reads "non-adhesive" and should read -- nonadhesive --.

Column 5,
Line 59, reads "Fig.IA" and should read -- Fig. 1A --.

Column 6,
Line 5 should not start a new paragraph.

Column 8,
Line 19 should not start a new paragraph.

Column 11,
Line 37 should not start a new paragraph.

Signed and Sealed this

First Day of January, 2002

*Attest:*

JAMES E. ROGAN
*Director of the United States Patent and Trademark Office*

*Attesting Officer*